United States Patent
Fujii et al.

(10) Patent No.: US 10,527,363 B2
(45) Date of Patent: Jan. 7, 2020

(54) CONDENSER

(71) Applicant: MITSUBISHI HITACHI POWER SYSTEMS, LTD., Kanagawa (JP)

(72) Inventors: Motoyuki Fujii, Tokyo (JP); Mitsuru Uchiyama, Kanagawa (JP); Jun Manabe, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 91 days.

(21) Appl. No.: 15/546,117

(22) PCT Filed: Mar. 8, 2016

(86) PCT No.: PCT/JP2016/057094
§ 371 (c)(1),
(2) Date: Jul. 25, 2017

(87) PCT Pub. No.: WO2016/143773
PCT Pub. Date: Sep. 15, 2016

(65) Prior Publication Data
US 2018/0023902 A1 Jan. 25, 2018

(30) Foreign Application Priority Data

Mar. 10, 2015 (JP) .................... 2015-047696

(51) Int. Cl.
*F28F 9/00* (2006.01)
*F28F 9/007* (2006.01)
(Continued)

(52) U.S. Cl.
CPC ............ *F28F 9/007* (2013.01); *F16F 15/067* (2013.01); *F25B 39/00* (2013.01); *F28D 7/163* (2013.01);
(Continued)

(58) Field of Classification Search
CPC .......... F28F 9/00; F28F 9/007; F28F 2265/30; F28B 1/02; F01K 11/02
See application file for complete search history.

(56) References Cited

U.S. PATENT DOCUMENTS 4,008,757 A * 2/1977 Weatherford, Jr. ....... F28F 9/00
165/67
4,286,549 A * 9/1981 Eisinger ................ F22B 37/244
122/510
(Continued)

FOREIGN PATENT DOCUMENTS

AT 30 767 11/1987
EP 1 662 198 5/2006
(Continued)

OTHER PUBLICATIONS

International Search Report dated May 24, 2016 in International (PCT) Application No. PCT/JP2016/057094.
(Continued)

*Primary Examiner* — Eric S Ruppert
(74) *Attorney, Agent, or Firm* — Wenderoth, Lind & Ponack, L.L.P.

(57) ABSTRACT

A condenser includes a housing formed in a hollow shape and having a steam inlet and a condensate outlet, inlet water chambers and outlet water chambers provided at respective ends of the housing. A large number of heat-transfer tubes connect the inlet water chambers and the outlet water chambers to each other inside the housing. Cooling water flows in the heat-transfer tubes, and intake pipes and drainpipes are respectively coupled to the inlet water chambers and outlet water chambers via expansion joints.

7 Claims, 10 Drawing Sheets

(51) Int. Cl.
*F28D 7/16* (2006.01)
*F16F 15/067* (2006.01)
*F25B 39/00* (2006.01)
*F28F 9/013* (2006.01)
*F28F 9/22* (2006.01)
*F28B 1/02* (2006.01)
*F25B 39/04* (2006.01)

(52) U.S. Cl.
CPC ............. *F28F 9/013* (2013.01); *F28F 9/22* (2013.01); *F25B 39/04* (2013.01); *F28B 1/02* (2013.01); *F28F 2265/30* (2013.01); *F28F 2265/32* (2013.01); *F28F 2280/10* (2013.01)

(56) References Cited

U.S. PATENT DOCUMENTS

| | | | | |
|---|---|---|---|---|
| 5,495,714 | A | * | 3/1996 | Gros .................. F01K 11/02 165/102 |
| 8,194,815 | B2 | | 6/2012 | Wroblewski et al. |
| 2007/0119388 | A1 | | 5/2007 | Waseda et al. |

FOREIGN PATENT DOCUMENTS

| | | |
|---|---|---|
| JP | 53-102406 | 9/1978 |
| JP | 61-128559 | 8/1986 |
| JP | 2001-3708 | 1/2001 |
| JP | 2008-64107 | 3/2008 |
| JP | 2010-237212 | 10/2010 |
| JP | 2011-220074 | 11/2011 |
| JP | 2012-167702 | 9/2012 |
| JP | 2013-164245 | 8/2013 |

OTHER PUBLICATIONS

Written Opinion of the International Searching Authority dated May 24, 2016 in International (PCT) Application No. PCT/JP2016/057094.

Office Action dated Sep. 19, 2019 in German Application No. 112016001136.9 with English translation.

* cited by examiner

CONDENSER

FIELD

The present invention relates to a condenser that cools and condenses steam used, for example, in a steam turbine by heat exchange with cooling water to return the steam to water in various power-generating plants such as a nuclear power plant and a thermal power plant.

BACKGROUND

For example, as the nuclear power plant, there is a pressurized water reactor (PWR). The pressurized water reactor uses light water as a nuclear reactor coolant and a neutron moderator, to turn the light water to high-temperature and high-pressure water that does not boil over the entire primary system. The high-temperature and high-pressure water is delivered to a steam generator to generate steam by heat exchange, and the steam is delivered to a turbine generator to generate power. At this time, the steam used for power generation in the turbine generator is cooled in a condenser to become condensate and is returned to the steam generator.

The condenser is provided with an inlet of steam at an upper part of a housing having a hollow shape, and with a discharge port of water (condensate) at a lower part of the housing. The condenser is configured in such a manner that an inlet water chamber is provided on one side of the housing and an outlet water chamber is provided on the other side, and a large number of narrow tubes through which the cooling water flows are arranged so as to connect the inlet water chamber and the outlet water chamber to each other. Therefore, the cooling water flows on a steady basis in the narrow tubes, and the steam flowing into the housing from the inlet becomes condensate by heat exchange (cooling) with the cooling water, and is discharged from the discharge port.

In such a condenser, the inlet water chamber and the outlet water chamber are respectively connected with a cooling water pipe via an expansion joint. At the time of occurrence of an earthquake or the like, the respective expansion joints absorb relative movement between the inlet water chamber and the outlet water chamber, and the respective cooling water pipes, thereby ensuring quake resistance.

As a device that prevents an excessive load from acting on a steel mount during operation of the steam turbine plant, for example, there is a device described in Patent Literature 1 described below. An installation method of the steam turbine plant described in Patent Literature 1 and an apparatus including the plant is such that a steel mount on which the steam turbine and a power generator are fixed is supported on a base mount via a spring mechanism and a vibration damper.

Conventionally, quake resistance is ensured by connecting the cooling water pipe to the inlet water chamber and the outlet water chamber via the expansion joints to absorb relative movement between the cooling water pipe and the inlet water chamber, and the outlet water chamber by the expansion joints. However, it is desired to further improve the quake resistance with respect to occurrence of a large earthquake in the future. In Japanese Laid-open Patent Publication No. 2001-003708 A, the steel mount is supported on the base mount by the spring mechanism and the vibration damper, and the technique described in Japanese Laid-open Patent Publication No. 2001-003708 A does not improve the quake resistance of the condenser.

The present invention has been achieved in view of the above problems, and an object of the present invention is to provide a condenser that can improve quake resistance by suppressing relative displacement between water chambers and pipes.

SUMMARY OF THE INVENTION

To achieve the above object, a condenser according to the present invention includes a housing formed in a hollow shape and provided with an inlet of steam and an outlet of condensate, an inlet water chamber and an outlet water chamber provided at respective ends of the housing, a large number of heat-transfer tubes that connect the inlet water chamber and the outlet water chamber to each other inside the housing, in which a cooling medium flows, intake pipes and drainpipes respectively coupled to the inlet water chamber and the outlet water chamber via an expansion joint, a damping member that damps displacement of the inlet water chamber and the outlet water chamber, and a restoration member that restores positions of the inlet water chamber and the outlet water chamber.

Therefore, when the condenser is operated in a predetermined natural vibration displacement mode, the housing, the inlet water chamber and the outlet water chamber, the intake pipes, and the drainpipes may be displaced in different directions. At this time, the damping member damps the displacement of the inlet water chamber and the outlet water chamber and the restoration member restores the positions of the inlet water chamber and the outlet water chamber. Therefore, the displacement of the inlet water chamber and the outlet water chamber decreases and the inlet water chamber and the outlet water chamber are restored to the original positions, thereby suppressing relative displacement between the inlet water chamber and the outlet water chamber, and the intake pipes and the drainpipes and decreasing stress acting on the expansion joints. As a result, quake resistance can be improved.

In the condenser according to the present invention, the housing, the intake pipes, and the drainpipes are supported on an installation surface, a support structure having predetermined stiffness set in advance is placed on the installation surface, and the damping member and the restoration member are interposed respectively between the inlet water chamber and the support structure, and between the outlet water chamber and the support structure.

Therefore, by interposing the damping member and the restoration member between the inlet water chamber and the support structure, and between the outlet water chamber and the support structure, the inlet water chamber and the outlet water chamber are restored to the original positions by decreasing displacement thereof with respect to the installation surface. Accordingly, relative displacement between the inlet water chamber and the outlet water chamber, and the intake pipes and the drainpipes can be suppressed appropriately.

In the condenser according to the present invention, a concrete structure is installed on the installation surface, and the housing and the support structure are supported by the concrete structure.

Therefore, by interposing the damping member and the restoration member between the inlet water chamber and the concrete structure, and between the outlet water chamber and the concrete structure, the inlet water chamber and the outlet water chamber are restored to the original positions by decreasing displacement thereof with respect to the installation surface. Accordingly, relative displacement between the inlet water chamber and the outlet water chamber, and the intake pipes and the drainpipes can be suppressed appropriately. Further, the support structure can be downsized.

In the condenser according to the present invention, the support structure is placed so as to surround the inlet water chamber and the outlet water chamber.

Therefore, because the support structure is placed so as to surround the inlet water chamber and the outlet water chamber, the flexibility of arrangement of the damping member and the restoration member increases according to the natural vibration displacement mode of the condenser, and relative displacement between the inlet water chamber and the outlet water chamber, and the intake pipes and the drainpipes can be suppressed appropriately.

In the condenser according to the present invention, the inlet water chamber and the outlet water chamber are provided in a plurality of sets with respect to the one housing, adjacent to ends of the housing, and the damping member and the restoration member are interposed between the inlet water chamber and the outlet water chamber adjacent to each other.

Therefore, by interposing the damping member and the restoration member between the inlet water chamber and the outlet water chamber adjacent to each other, even if the quantity of water in the housing is different, the relative displacement between the inlet water chamber and the outlet water chamber can be suppressed appropriately.

In the condenser according to the present invention, the damping member and the restoration member are interposed between the inlet water chamber and the outlet water chamber in the respective housings adjacent to each other.

Therefore, by interposing the damping member and the restoration member between the inlet water chamber and the outlet water chamber in the respective housings adjacent to each other, even if the natural vibration displacement mode of the housings adjacent to each other is different, the relative displacement between the inlet water chamber of one of the adjacent housings and the outlet water chamber of the other housing can be suppressed appropriately.

In the condenser according to the present invention, end portions of the damping member and the restoration member are rotatably supported.

Therefore, when the damping member and the restoration member restore the inlet water chamber and the outlet water chamber to the original positions by decreasing the displacement thereof, the end portions of the damping member and the restoration member rotate to suppress stress concentration on the end portions.

In the condenser according to the present invention, the inlet water chamber and the outlet water chamber are formed to be long along a vertical direction, an inlet nozzle and an outlet nozzle provided at a lower part thereof are coupled to an intake pipe and a drainpipe via the expansion joint, and end portions of the damping member and the restoration member are coupled to the vicinity of the expansion joint in the inlet water chamber and the outlet water chamber.

Therefore, by connecting the end portions of the damping member and the restoration member to the vicinity of the expansion joint in the inlet water chamber and the outlet water chamber, the inlet water chamber and the outlet water chamber are restored to the original positions by suppressing displacement of the vicinity of the expansion joint in the inlet water chamber and the outlet water chamber, thereby enabling to reduce the stress acting on the expansion joint.

Advantageous Effects of Invention

According to the condenser of the present invention, since a damping member that damps displacement of an inlet water chamber and an outlet water chamber and a restoration member that restores positions of the inlet water chamber and the outlet water chamber are provided, an effect is obtained where it is possible to improve quake resistance by suppressing relative displacement between water chambers and pipes.

DETAILED DESCRIPTION OF EMBODIMENTS

Preferred embodiments of a condenser according to the present invention will be described in detail below with reference to the accompanying drawings. The present invention is not limited to the embodiments, and when there are a plurality of embodiments, embodiments carried out by combining the respective embodiments are also included in the present invention.

First Embodiment

A condenser according to a first embodiment is applied, for example, to a nuclear power plant and the nuclear power plant is configured by a pressurized water reactor and a steam generator stored in a containment, a steam turbine, a power generator, a condenser, and the like. The pressurized water reactor uses light water as a nuclear reactor coolant and a neutron moderator to turn the light water to high-temperature and high-pressure water that does not boil over the entire reactor internal, and delivers the high-temperature and high-pressure water to the steam generator to generate steam by heat exchange.

The steam generator is coupled to a steam turbine via a cooling water pipe, and the steam turbine is coupled to the condenser. The condenser is provided with an intake pipe and a drainpipe in which cooling water (for example, seawater) circulates, and is coupled to the steam generator via the cooling water pipe. Therefore, steam generated by the steam generator is delivered to the steam turbine via the cooling water pipe to drive the steam turbine to perform power generation by the power generator. The steam that has driven the steam turbine is cooled by the condenser using seawater to become condensate, and is returned to the steam generator via the cooling water pipe.

Figure 6:
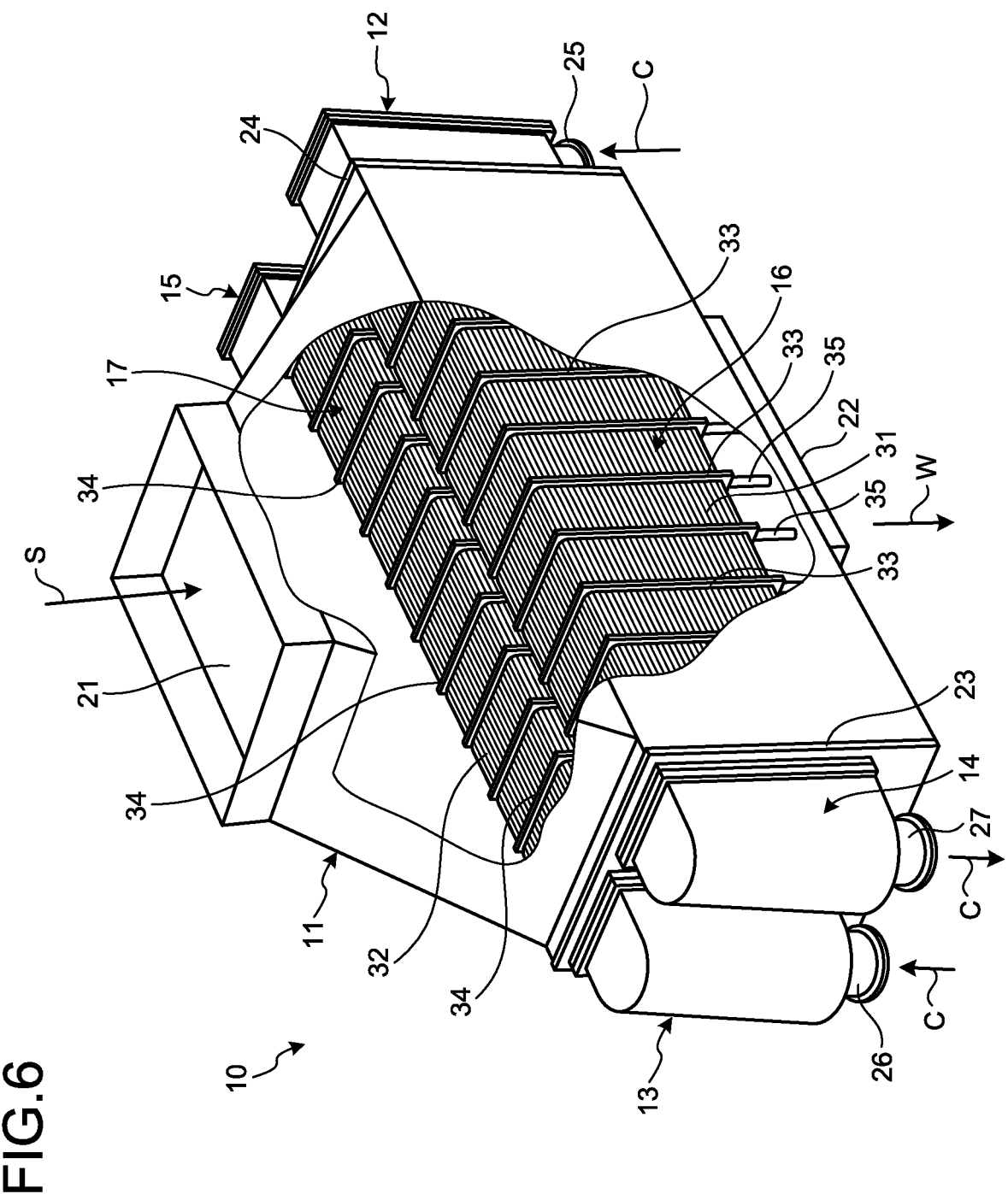
FIG. 6 is a partially cutaway perspective view illustrating the overall configuration of the condenser.

The condenser according to the first embodiment is described here. FIG. 6 is a partially cutaway perspective view illustrating the overall configuration of the condenser.

As illustrated in FIG. 6, a condenser 10 includes a housing 11, inlet water chambers 12, 13, outlet water chambers 14, 15, and heat-transfer tube groups 16 and 17.

The housing 11 has a hollow box shape with an upper part being a square pyramid. In the housing 11, a steam inlet 21 is formed in an upper part thereof, to which used steam flows, and a condensate outlet 22 is formed in a lower part thereof, from which water (condensate) generated by condensation of steam is discharged.

Tube plates 23 and 24 are fixed to the respective ends of the housing 11 in a longitudinal direction thereof (a horizontal direction). The inlet water chamber 12 and the outlet water chamber 15 are fixed to be adjacent to one tube plate 24 in the horizontal direction, and the outlet water chamber 14 and the inlet water chamber 13 are fixed to be adjacent to the other tube plate 23. The inlet water chamber 12 and the outlet water chamber 14 are arranged at positions opposite to each other in the horizontal direction via the housing 11, and the inlet water chamber 13 and the outlet water chamber 15 are arranged at positions opposite to each other in the horizontal direction via the housing 11. Inlet nozzles 25, 26 are provided at the lower part of the inlet water chambers 12, 13, and outlet nozzles 27, 28 (see FIG. 1) are provided at the lower part of the outlet water chambers 14, 15.

The inlet water chamber 12 and the outlet water chamber 14 are coupled to each other by the heat-transfer tube group 16 in the housing 11, and the inlet water chamber 13 and the outlet water chamber 15 are coupled to each other by the heat-transfer tube group 17 in the housing 11. The heat-transfer tube group 16 is configured by a plurality of heat-transfer tubes 31 and arranged inside the housing 11, with one end thereof being supported so as to penetrate the tube plate 23 and the other end being supported so as to penetrate the tube plate 24. Therefore, the inlet water chamber 12 and the outlet water chamber 14 communicate with each other by the plurality of the heat-transfer tubes 31. The heat-transfer tube group 17 is configured by a plurality of heat-transfer tubes 32 and arranged inside the housing 11, with one end thereof being supported so as to penetrate the tube plate 23 and the other end being supported so as to penetrate the tube plate 24. Therefore, the inlet water chamber 13 and the outlet water chamber 15 communicate with each other by the plurality of the heat-transfer tubes 32.

In the housing 11, a plurality of tube support plates 33 and 34 are arranged inside of the housing 11 in the longitudinal direction of the respective heat-transfer tubes 31 and 32 with a predetermined interval. A lower part of the tube support plate 33 is supported on the bottom of the housing 11 by a support member 35, and a lower part of the tube support plate 34 is supported on the bottom and the side of the housing 11 by a support member (not illustrated in the drawings). A middle part of the heat-transfer tube 31 is supported by penetrating the respective tube support plates 33, and a middle part of the heat-transfer tube 32 is supported by penetrating the respective tube support plates 34.

Therefore, steam S enters the housing 11 from the steam inlet 21, flows downward in a vertical direction in the housing 11, and is discharged from the condensate outlet 22 as condensate W. Meanwhile, seawater C as cooling water is introduced from the respective inlet nozzles 25, 26 into the respective inlet water chambers 12, 13, flows in the respective heat-transfer tubes 31 and 32 along the horizontal direction to flow into the outlet water chambers 14, 15, and is discharged from the respective outlet nozzles 27, 28. Because the steam S flows in the housing 11 in the vertical direction, and the seawater C flows in the heat-transfer tubes 31 and 32 in the horizontal direction, the flow of the steam S and the flow of the seawater C intersect with each other without being mixed, and heat exchange is performed. That is, the steam S is cooled by the seawater C flowing in the heat-transfer tubes 31 and 32, and becomes the condensate W to fall in the housing 11.

Figure 1:
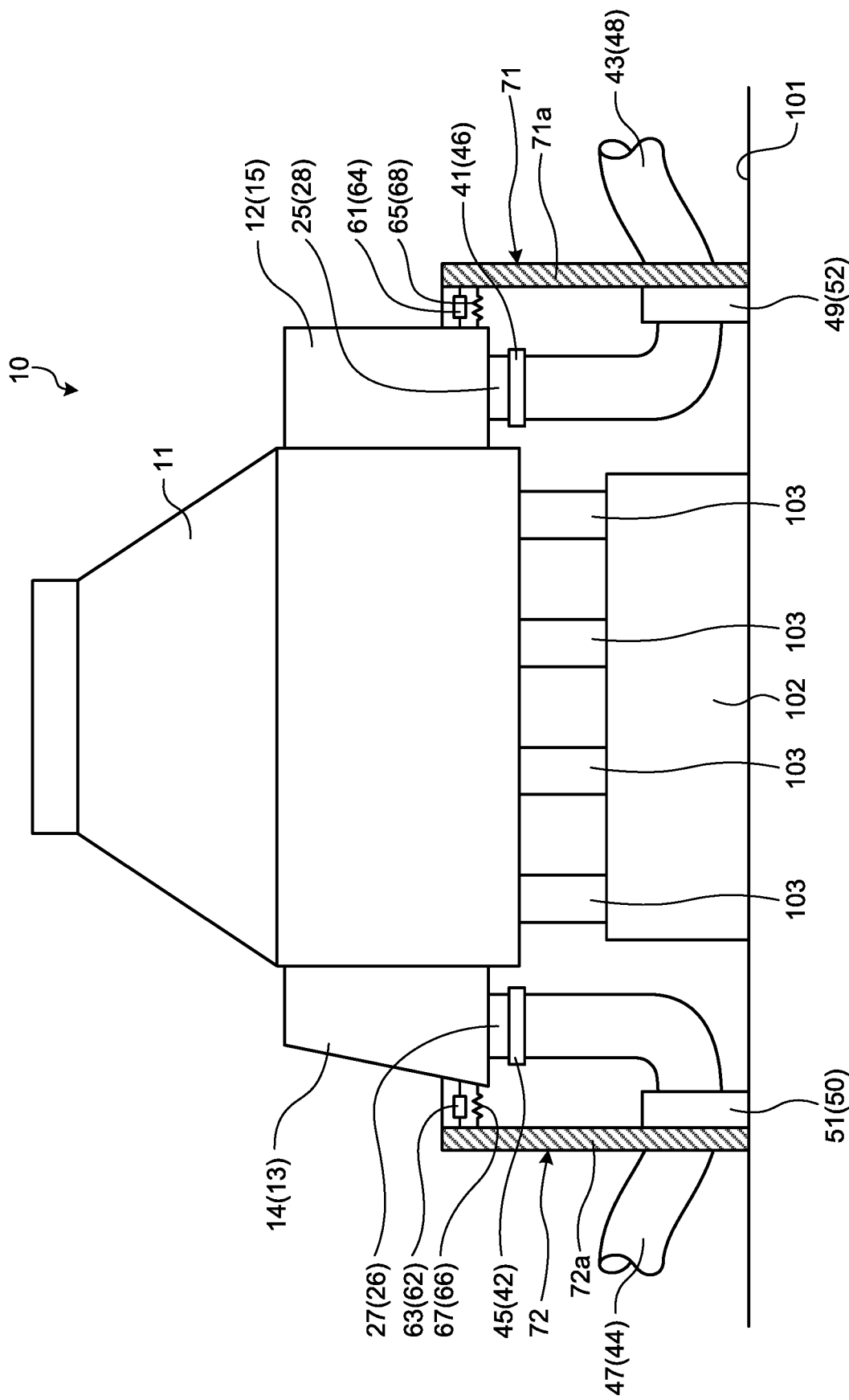
FIG. 1 is a front view illustrating a condenser according to a first embodiment.
Figure 2:
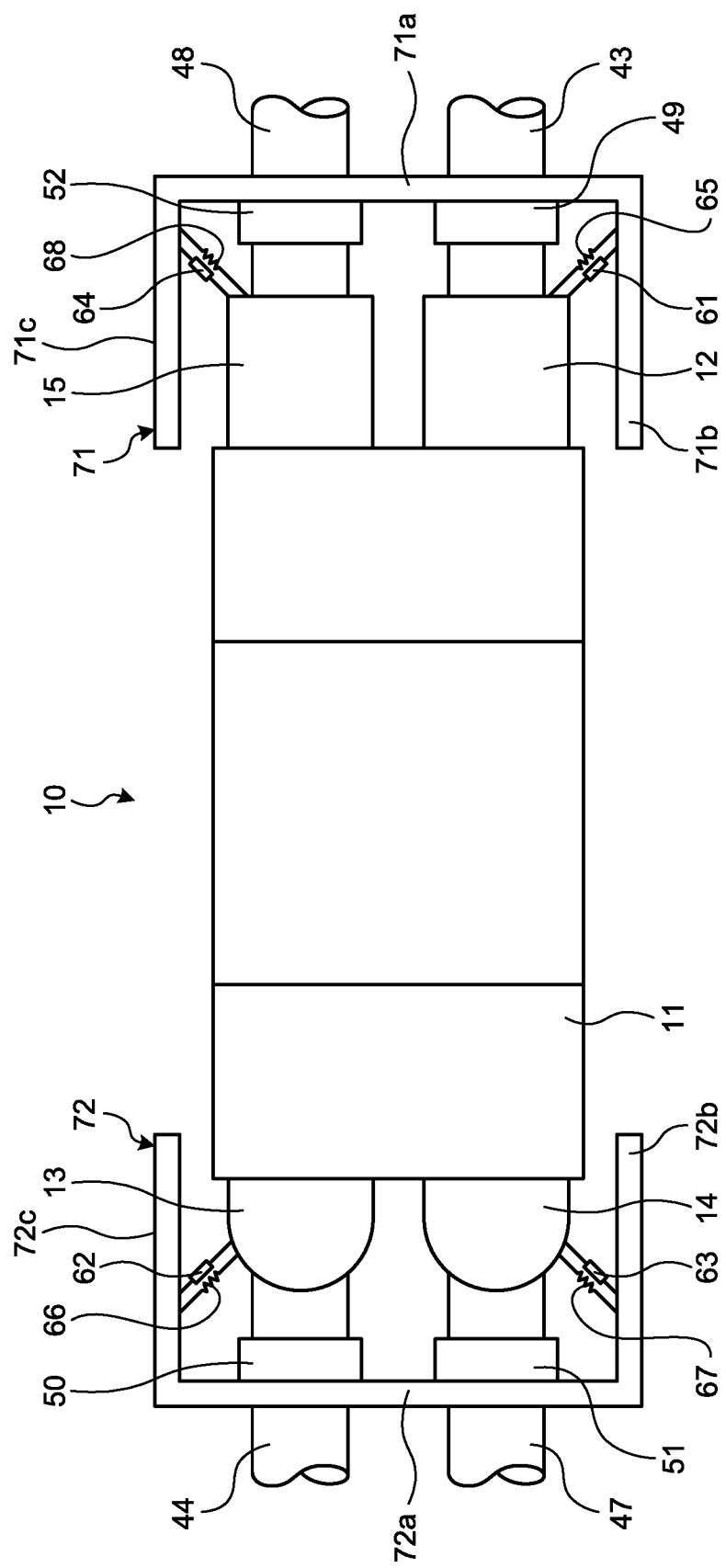
FIG. 2 is a plan view illustrating the condenser.
Figure 3:
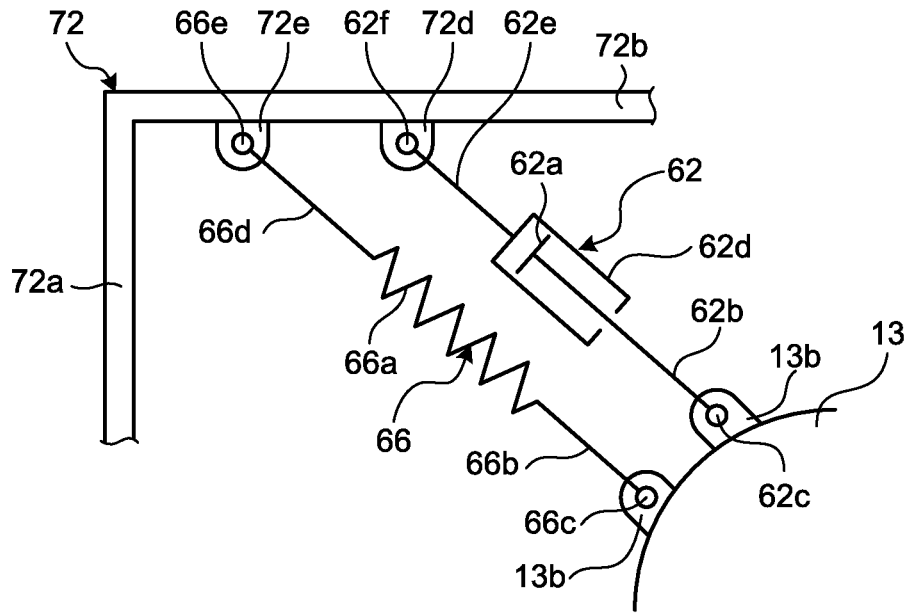
FIG. 3 is a schematic diagram illustrating an attachment structure of a damping member and a restoration member.
Figure 4:
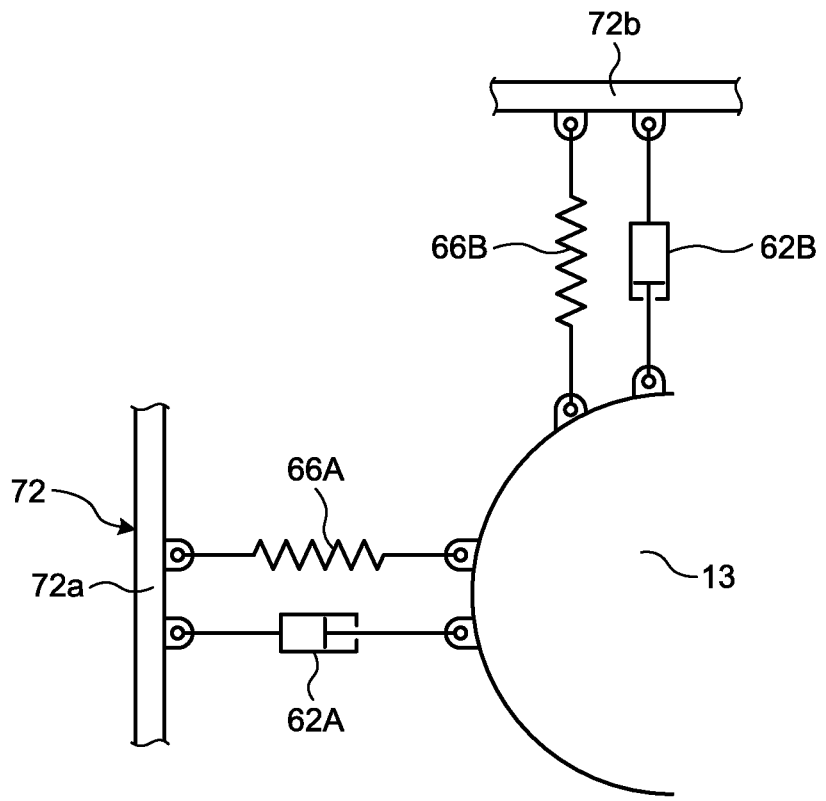
FIG. 4 is a schematic diagram illustrating a modification of the attachment structure of the damping member and the restoration member.

FIG. 1 is a front view illustrating the condenser according to the first embodiment. FIG. 2 is a plan view illustrating the condenser. FIG. 3 is a schematic diagram illustrating an attachment structure of a damper (damping member) and a restoration member. FIG. 4 is a schematic diagram illustrating a modification of the attachment structure of the damper.

In the condenser 10, as illustrated in FIGS. 1 and 2, a concrete base (a concrete structure) 102 having a rectangular block shape is installed on an installation surface 101 having a planar shape added with concrete, and the housing 11 is installed and supported on the concrete base 102 via a plurality of concrete legs 103. The inlet nozzles 25, 26 of the inlet water chambers 12, 13 are coupled to intake pipes 43, 44 via respective intake expansion joints 41, 42, and the outlet nozzles 27, 28 of the outlet water chambers 14, 15 are coupled to drainpipes 47, 48 via respective drain expansion joints 45, 46. The intake pipes 43, 44 are fixed on the installation surface 101 by fixing brackets 49, 50, and the drainpipes 47, 48 are fixed on the installation surface 101 by fixing brackets 51, 52.

Figure 7:
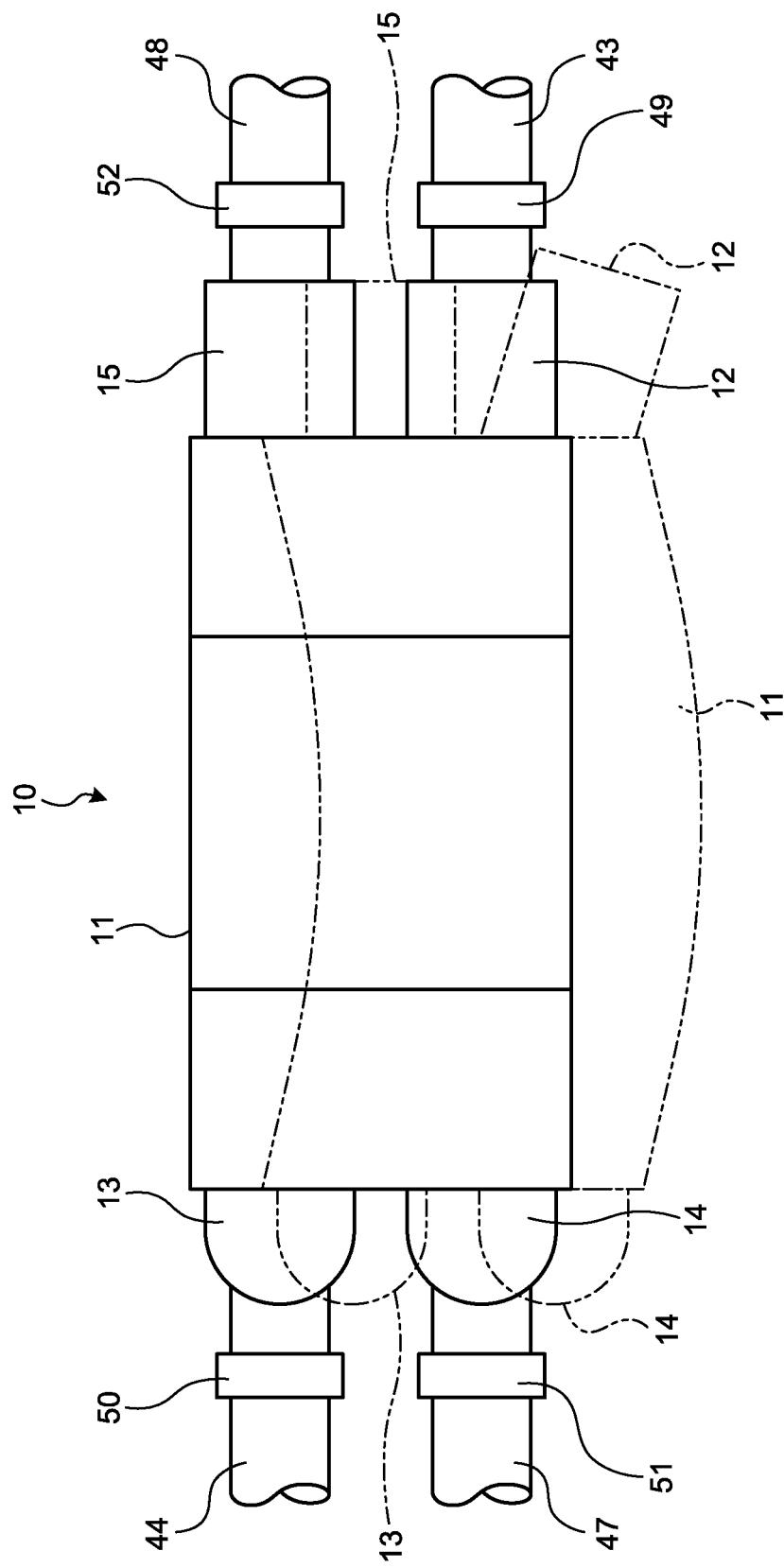
FIG. 7 is a schematic diagram illustrating a natural vibration displacement mode of the condenser.

In the condenser 10 configured in this manner, a natural vibration frequency, that is, a natural vibration displacement mode is set based on the shape or thickness of respective members that constitute the condenser, a connection structure, or the like. FIG. 7 is a schematic diagram illustrating the natural vibration displacement mode of the condenser.

In the condenser 10, the housing 11 is fixed on the concrete base 102 via the concrete legs 103, the intake pipes 43, 44 are fixed on the installation surface 101 by the fixing brackets 49, 50, and the drainpipes 47, 48 are fixed on the installation surface 101 by the fixing brackets 51, 52. Therefore, the condenser 10 has the natural vibration displacement mode illustrated, for example, in FIG. 7. That is, at the time of occurrence of an earthquake, the housing 11 is displaced in parallel to the horizontal direction, and is curved (becomes pliant) so that the inlet water chambers 12, 13 and the outlet water chambers 14, 15 are displaced to rotate in the horizontal direction about a support axis along the vertical direction.

At this time, because being fixed on the installation surface 101 (the concrete base 102) having predetermined stiffness, the housing 11, the intake pipes 43, 44, and the drainpipes 47, 48 are hardly displaced. On the other hand, the inlet water chambers 12, 13 and the outlet water chambers 14, 15 are displaced relatively largely. When an amount of displacement of the inlet water chambers 12, 13 and the outlet water chambers 14, 15 increases, a relative displacement amount between the inlet nozzles 25, 26 and the intake pipes 43, 44 becomes large, and a relative displacement amount between the outlet nozzles 27, 28 and the drainpipes 47, 48 also becomes large. Consequently, stress acts on the respective expansion joints 41, 42, 45, and 46, and expansion joints may be deformed or broken.

Therefore, as illustrated in FIGS. 1 and 2, the condenser 10 according to the first embodiment is provided with dampers (damping members) 61, 62, 63, and 64 that damp displacement of the inlet water chambers 12, 13 and the outlet water chambers 14, 15, and restoration members 65, 66, 67, and 68 that restore positions of the inlet water chambers 12, 13 and the outlet water chambers 14, 15.

In the condenser 10, a support structure 71 is placed adjacent to the inlet water chamber 12 and the outlet water chamber 15, and a support structure 72 is placed adjacent to the inlet water chamber 13 and the outlet water chamber 14. The respective support structures 71, 72 are placed on the installation surface 101 so as to surround the inlet water chamber 12 and the outlet water chamber 15, and the inlet water chamber 13 and the outlet water chamber 14, respectively. The respective support structures 71, 72 are configured by middle walls 71a, 72a facing the housing 11, and pairs of side walls 71b, 71c, 72b, and 72c respectively coupled to the respective ends of the middle walls 71a, 72a along the longitudinal direction of the housing 11. The respective support structures 71, 72 have a U shape in a planar view by the middle walls 71a, 72a and the side walls 71b, 71c, 72b, and 72c.

The damping member 61 and the restoration member 65 are interposed between the inlet water chamber 12 and the support structure 71 (the side wall 71b), and the damping member 64 and the restoration member 68 are interposed between the outlet water chamber 15 and the support structure 71 (the side wall 71c). The damping member 62 and the restoration member 66 are interposed between the inlet water chamber 13 and the support structure 72 (the side wall 72c), and the damping member 63 and the restoration member 67 are interposed between the outlet water chamber 14 and the support structure 72 (the side wall 72b).

The inlet water chambers 12, 13 and the outlet water chambers 14, 15 are formed to be long along the vertical direction, and the inlet nozzles 25, 26 and the outlet nozzles 27, 28 are coupled, respectively, to the intake pipes 43, 44 and the drainpipes 47, 48 via the expansion joints 41, 42, 45, and 46. Ends of the damping members 61, 62, 63, and 64 and the restoration members 65, 66, 67, and 68 are coupled to the vicinity of the expansion joints 41, 42, 45, and 46 in the inlet water chambers 12, 13 and the outlet water chambers 14, 15. In this case, the ends of the damping members 61, 62, 63, and 64, and the restoration members 65, 66, 67, and 68 are coupled to the inlet water chambers 12, 13 and the outlet water chambers 14, 15 at a lower position than a middle position in the vertical direction of the inlet water chambers 12, 13 and the outlet water chambers 14, 15. However, it is desired to set the damping members and the restoration members within a range of motion in which resilience and a damping force thereof can be obtained.

The damping members 61, 62, 63, and 64 and the restoration members 65, 66, 67, and 68 are rotatably supported at the ends. For example, as illustrated in FIG. 3, the damping member 62 is an oil damper, in which a rod 62b on the side of a piston 62a is rotatably supported to a bracket 13a fixed to the inlet water chamber 13 by a support pin 62c, and a rod 62e on the side of a cylinder 62d is rotatably supported to a bracket 72d fixed to the support structure 72 by a support pin 62f. In this case, the respective support pins 62c and 62f are along the vertical direction, and the damping member 62 can rotate in the horizontal direction.

The restoration member 66 is a resilient element such as a tension spring (a metal spring), and one end 66b of the spring 66a is rotatably supported to a bracket 13b fixed to the inlet water chamber 13 by a support pin 66c, and the other end 66d thereof is rotatably supported to a bracket 72e fixed to the support structure 72 by a support pin 66e. In this case, the respective support pins 66c and 66e are along the vertical direction, and the restoration member 66 can rotate in the horizontal direction.

Although not illustrated, other damping members 61, 63, and 64 and other restoration members 65, 67, and 68 are rotatably supported at the ends by the support pins in the similar manner.

The damping members 61, 62, 63, and 64 and the restoration members 65, 66, 67, and 68 are arranged with a predetermined inclination angle with respect to an external surface of the housing 11 having a rectangular shape in a planar view. The arrangement directions of the damping members 61, 62, 63, and 64 and the restoration members 65, 66, 67, and 68 are set according to the natural vibration displacement mode of the condenser 10 described above.

Therefore, when the condenser 10 is displaced in the predetermined natural vibration displacement mode, the housing 11, the inlet water chambers 12, 13 and the outlet water chambers 14, 15, and the intake pipes 43, 44 and the drainpipes 47, 48 are displaced in different directions. At this time, displacement of the inlet water chambers 12, 13 and the outlet water chambers 14, 15 is damped by the respective damping members 61, 62, 63, and 64, and the inlet water chambers 12, 13 and the outlet water chambers 14, 15 are restored to the original positions by the restoration members 65, 66, 67, and 68. Therefore, displacement of the inlet water chambers 12, 13 and the outlet water chambers 14, 15 decreases and the inlet water chambers 12, 13 and the outlet water chambers 14, 15 are restored to the original positions. Accordingly, the relative displacement between the inlet nozzles 25, 26 and the outlet nozzles 27, 28, and the respective expansion joints 41, 42, 45, and 46 is suppressed, to decrease the stress acting on the expansion joints 41, 42, 45, and 46, thereby enabling to prevent breakage thereof.

The arrangement directions of the damping members 61, 62, 63, and 64 and the restoration members 65, 66, 67, and 68 are not limited to the directions described above. For example, as illustrated in FIG. 4, a damping member 62A and a restoration member 66A are arranged at right angles to an end face of the housing 11 having a rectangular shape in a planar view, and a damping member 62B and a restoration member 66B are arranged in parallel to the end face of the housing 11. That is, the natural vibration displacement mode of the condenser only needs to be analyzed beforehand, to set the arrangement directions of the damping member and the restoration member according to the natural vibration displacement mode of the condenser. In this case, the damping member and the restoration member can be arranged inclined vertically to the horizontal direction, without being arranged horizontally. Further, the rotating direction of the ends of the damping member and the restoration member is not limited to the horizontal direction, and can be supported spherically so as to be supported swingably in all directions.

Figure 5:
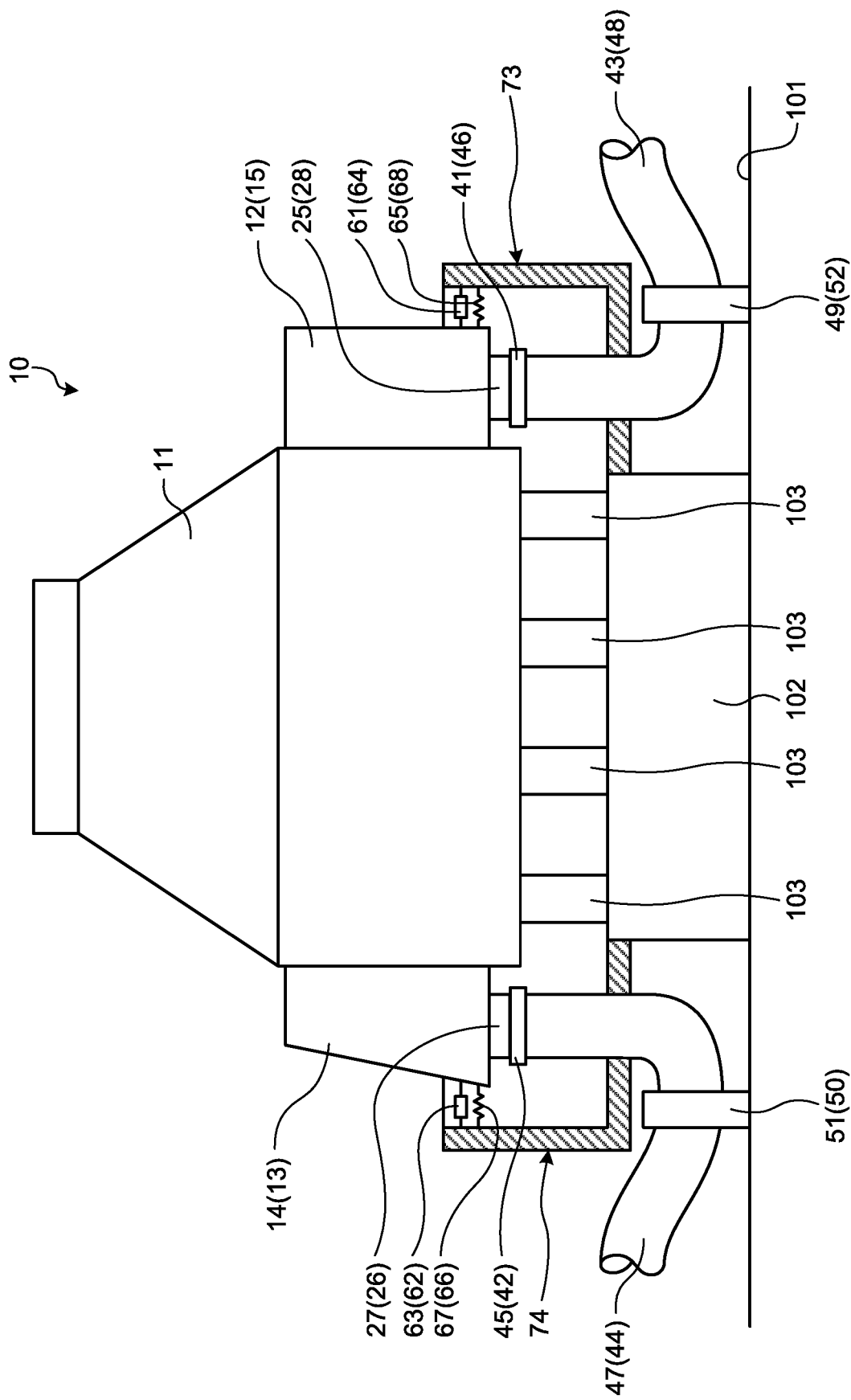
FIG. 5 is a front view illustrating a modification of the condenser according to the first embodiment.

In the above descriptions, the support structures 71, 72 are placed on the installation surface 101. However, the configuration is not limited thereto. FIG. 5 is a front view illustrating a modification of the condenser according to the first embodiment. As illustrated in FIG. 5, in the condenser 10, a support structure 73 is placed adjacent to the inlet water chamber 12 and the outlet water chamber 15, and a support structure 74 is placed adjacent to the inlet water chamber 13 and the outlet water chamber 14. The respective support structures 73 and 74 are provided on the concrete base 102 so as to surround the inlet water chamber 12 and the outlet water chamber 15, the inlet water chamber 13 and the outlet water chamber 14, respectively.

In the present embodiment, the support structures 71, 72, 73, and 74 are provided on the installation surface 101 and the concrete base 102. However, if there is a structure such as an existing building around the condenser 10, the structure can be applied as a support structure.

The condenser according to the first embodiment includes the housing 11 formed in a hollow shape and provided with the steam inlet 21 and the condensate outlet 22, the inlet water chambers 12, 13 and the outlet water chambers 14, 15 provided at respective ends of the housing 11, the large number of heat-transfer tubes 31, 32 that connect the inlet water chambers 12, 13 and the outlet water chambers 14, 15 to each other inside the housing 11, in which the cooling water flows. The condenser also includes the intake pipes 43, 44 and the drainpipes 47, 48 respectively coupled to the inlet water chambers 12, 13 and the outlet water chambers 14, 15 via the expansion joints 41, 42, 45, and 46, the damping members 61, 62, 63, and 64 that damp displacement of the inlet water chambers 12, 13 and the outlet water chambers 14, 15, and the restoration members 65, 66, 67, and 68 that restore positions of the inlet water chambers 12, 13 and the outlet water chambers 14, 15.

Therefore, when the condenser 10 is operated in the predetermined natural vibration displacement mode, the housing 11, the inlet water chambers 12, 13 and the outlet water chambers 14, 15, the intake pipes 43, 44, and the drainpipes 47, 48 may be displaced in different directions. At this time, the damping members 61, 62, 63, and 64 damp the displacement of the inlet water chambers 12, 13 and the outlet water chambers 14, 15 and the restoration members 65, 66, 67, and 68 restore the positions of the inlet water chambers 12, 13 and the outlet water chambers 14, 15. Therefore, the displacement of the inlet water chambers 12, 13 and the outlet water chambers 14, 15 decreases and the inlet water chambers 12, 13 and the outlet water chambers 14, 15 are restored to the original positions, thereby suppressing relative displacement of the inlet water chambers 12, 13 and the outlet water chambers 14, 15 with respect to the intake pipes 43, 44 and the drainpipes 47, 48 and decreasing stress acting on the expansion joints 41, 42, 45, and 46. As a result, the quake resistance of the condenser 10 can be improved.

In the condenser according to the first embodiment, the support structures 71, 72 that support the intake pipes 43, 44 and the drainpipes 47, 48 on the installation surface 101 and have predetermined stiffness set in advance are placed on the installation surface 101. Further, the damping members 61, 62, 63, and 64 and the restoration members 65, 66, 67, and 68 are interposed between the inlet water chambers 12, 13 and the outlet water chambers 14, 15, and the support structures 71, 72. Therefore, the inlet water chambers 12, 13 and the outlet water chambers 14, 15 are restored to the original positions by decreasing displacement thereof with respect to the installation surface 101. Accordingly, relative displacement of the inlet water chambers 12, 13 and the outlet water chambers 14, 15 with respect to the intake pipes 43, 44 and the drainpipes 47, 48 can be suppressed appropriately.

In the condenser according to the first embodiment, the concrete base 102 is installed on the installation surface 101, and the housing 11 and the support structures 73, 74 are supported on the concrete base 102. Therefore, the inlet water chambers 12, 13 and the outlet water chambers 14, 15 are restored to the original positions by decreasing displacement thereof with respect to the installation surface 101. Accordingly, relative displacement of the inlet water chambers 12, 13 and the outlet water chambers 14, 15 with respect to the intake pipes 43, 44 and the drainpipes 47, 48 can be suppressed appropriately. Further, the support structures 73, 74 can be downsized.

In the condenser according to the first embodiment, the support structures 71, 72 are placed so as to surround the inlet water chambers 12, 13 and the outlet water chambers 14, 15. Therefore, the flexibility of arrangement of the damping members 61, 62, 63, and 64 and the restoration members 65, 66, 67, and 68 increases according to the natural vibration displacement mode of the condenser 10, and relative displacement of the inlet water chambers 12, 13 and the outlet water chambers 14, 15 with respect to the intake pipes 43, 44 and the drainpipes 47, 48 can be suppressed appropriately.

In the condenser according to the first embodiment, the ends of the damping members 61, 62, 63, and 64 and the restoration members 65, 66, 67, and 68 are rotatably supported. Therefore, when the damping members 61, 62, 63, and 64 and the restoration members 65, 66, 67, and 68 restore the inlet water chambers 12, 13 and the outlet water chambers 14, 15 to the original positions by decreasing displacement thereof, the ends thereof rotate, thereby enabling to suppress stress concentration on the ends thereof.

In the condenser according to the first embodiment, the inlet water chambers 12, 13 and the outlet water chambers 14, 15 are formed to be long along the vertical direction, and the inlet nozzles 25, 26 and the outlet nozzles 27, 28 provided at a lower part thereof are coupled to the intake pipes 43, 44 and the drainpipes 47, 48 via the expansion joints 41, 42, 45, and 46. The ends of the damping members 61, 62, 63, and 64 and the restoration members 65, 66, 67, and 68 are coupled to the vicinity of the expansion joints 41, 42, 45, and 46 in the inlet water chambers 12, 13 and the outlet water chambers 14, 15. Therefore, the inlet water chambers 12, 13 and the outlet water chambers 14, 15 are restored to the original positions by suppressing the displacement of the vicinity of the expansion joints 41, 42, 45, and 46 in the inlet water chambers 12, 13 and the outlet water chambers 14, 15, thereby enabling to decrease the stress acting on the expansion joints 41, 42, 45, and 46.

Second Embodiment

Figure 8:
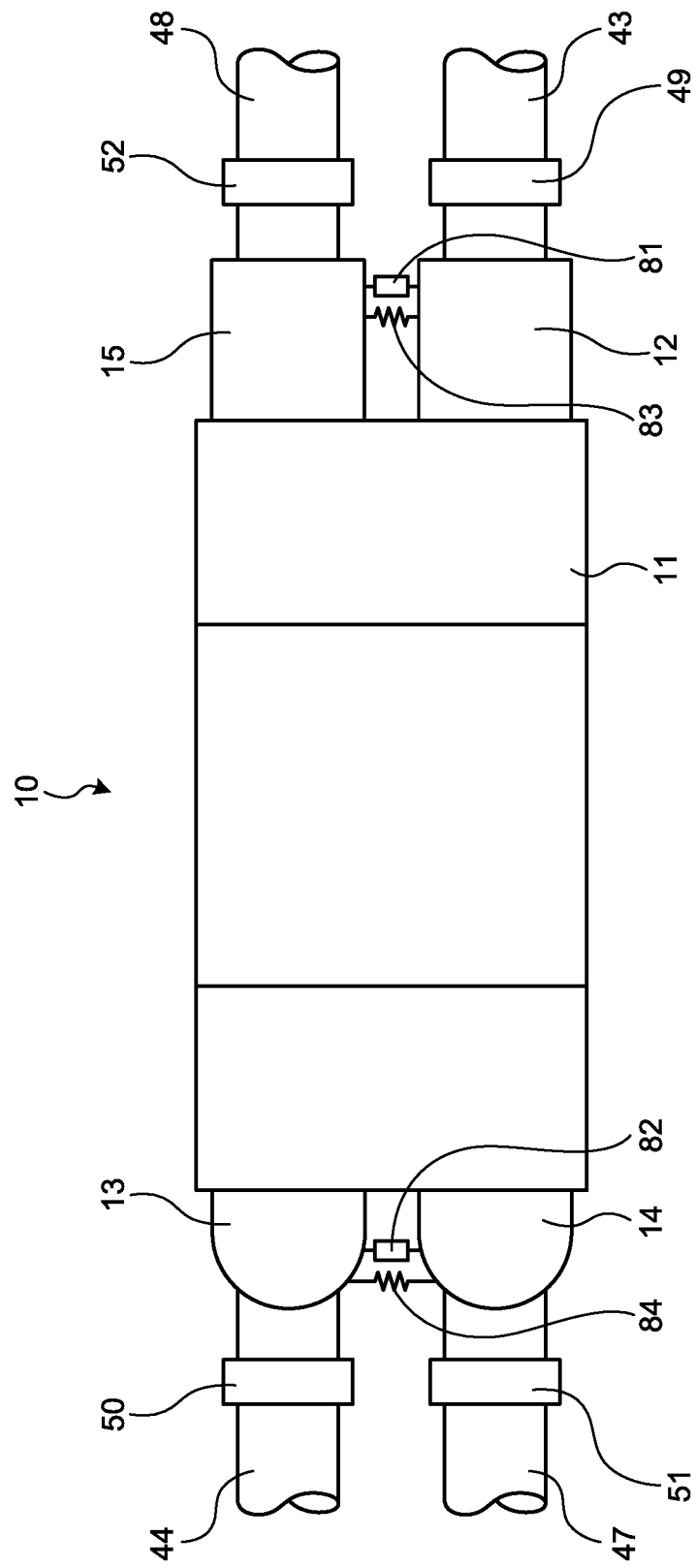
FIG. 8 is a plan view illustrating a condenser according to a second embodiment.
Figure 9:
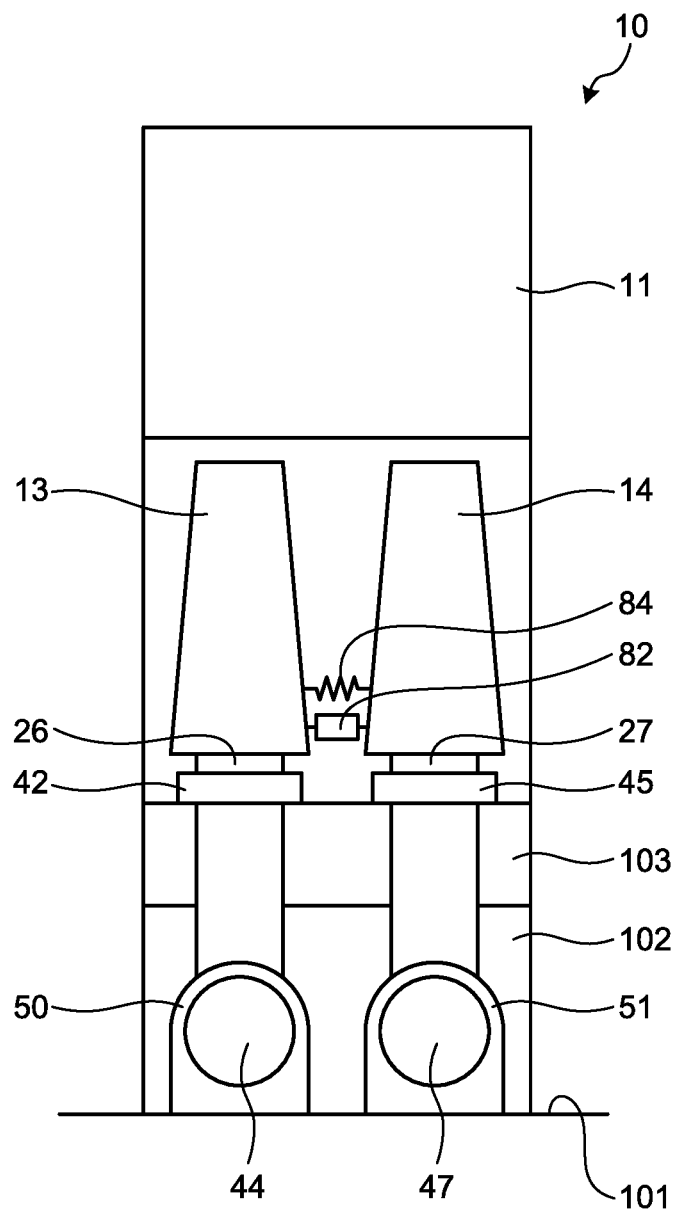
FIG. 9 is a side view of the condenser.

FIG. 8 is a plan view illustrating a condenser according to a second embodiment, and FIG. 9 is a side view of the condenser. Members having functions identical to those of the embodiment described above are denoted by like reference signs and detailed explanations thereof will be omitted.

In the second embodiment, as illustrated in FIG. 8 and FIG. 9, the condenser 10 is provided with the inlet water chamber 12 and the outlet water chamber 15 at one end of the housing 11, and the inlet water chamber 13 and the outlet water chamber 14 at the other end. A damping member 81 and a restoration member 83 are interposed between the inlet water chamber 12 and the outlet water chamber 15 adjacent to each other, and a damping member 82 and a restoration member 84 are interposed between the inlet water chamber 13 and the outlet water chamber 14 adjacent to each other.

Therefore, when the condenser 10 is displaced in a predetermined natural vibration displacement mode, the housing 11, the inlet water chambers 12, 13 and the outlet water chambers 14, 15, the intake pipes 43, 44, and the drainpipes 47, 48 are displaced in different directions. Further, displacement of the inlet water chamber 12 and the outlet water chamber 15 adjacent to each other, or displacement of the inlet water chamber 13 and the outlet water chamber 14 adjacent to each other occurs in different directions according to the predetermined natural vibration displacement mode, respectively. For example, the inlet water chamber 12 and the outlet water chamber 15, and the inlet water chamber 13 and the outlet water chamber 14 respectively approach each other or are away from each other. At this time, displacement of the inlet water chamber 12 and the outlet water chamber 15 is damped by the damping member 81, and the positions thereof are restored to the original positions by the restoration member 83. Further, displacement of the inlet water chamber 13 and the outlet water chamber 14 is damped by the damping member 82, and the positions thereof are restored to the original positions by the restoration member 84. Therefore, displacement of the inlet water chambers 12, 13 and the outlet water chambers 14, 15 decreases and the inlet water chambers 12, 13 and the outlet water chambers 14, 15 are restored to the original positions. Accordingly, relative displacement of the inlet nozzles 25, 26 and the outlet nozzles 27, 28 with respect to the respective expansion joints 41, 42, 45, and 46 is suppressed, to decrease the stress acting on the expansion joints 41, 42, 45, and 46, thereby enabling to prevent breakage thereof.

In this manner, in the condenser according to the second embodiment, the damping member 81 and the restoration member 83 are interposed between the inlet water chamber 12 and the outlet water chamber 15 adjacent to each other, and the damping member 82 and the restoration member 84 are interposed between the inlet water chamber 13 and the outlet water chamber 14 adjacent to each other.

Therefore, the damping members 81, 82 damp the displacement of the inlet water chambers 12, 13 and the outlet water chambers 14, 15, and the restoration members 83, 84 restore the inlet water chambers 12, 13 and the outlet water chambers 14, 15 to the original positions. Accordingly, the displacement of the inlet water chambers 12, 13 and the outlet water chambers 14, 15 decreases, and the inlet water chambers 12, 13 and the outlet water chambers 14, 15 are restored to the original positions. Accordingly, relative displacement of the inlet water chambers 12, 13 and the outlet water chambers 14, 15 with respect to the intake pipes 43, 44 and the drainpipes 47, 48 is suppressed, to decrease the stress acting on the expansion joints 41, 42, 45, and 46. As a result, the quake resistance of the condenser 10 can be improved.

Third Embodiment

Figure 10:
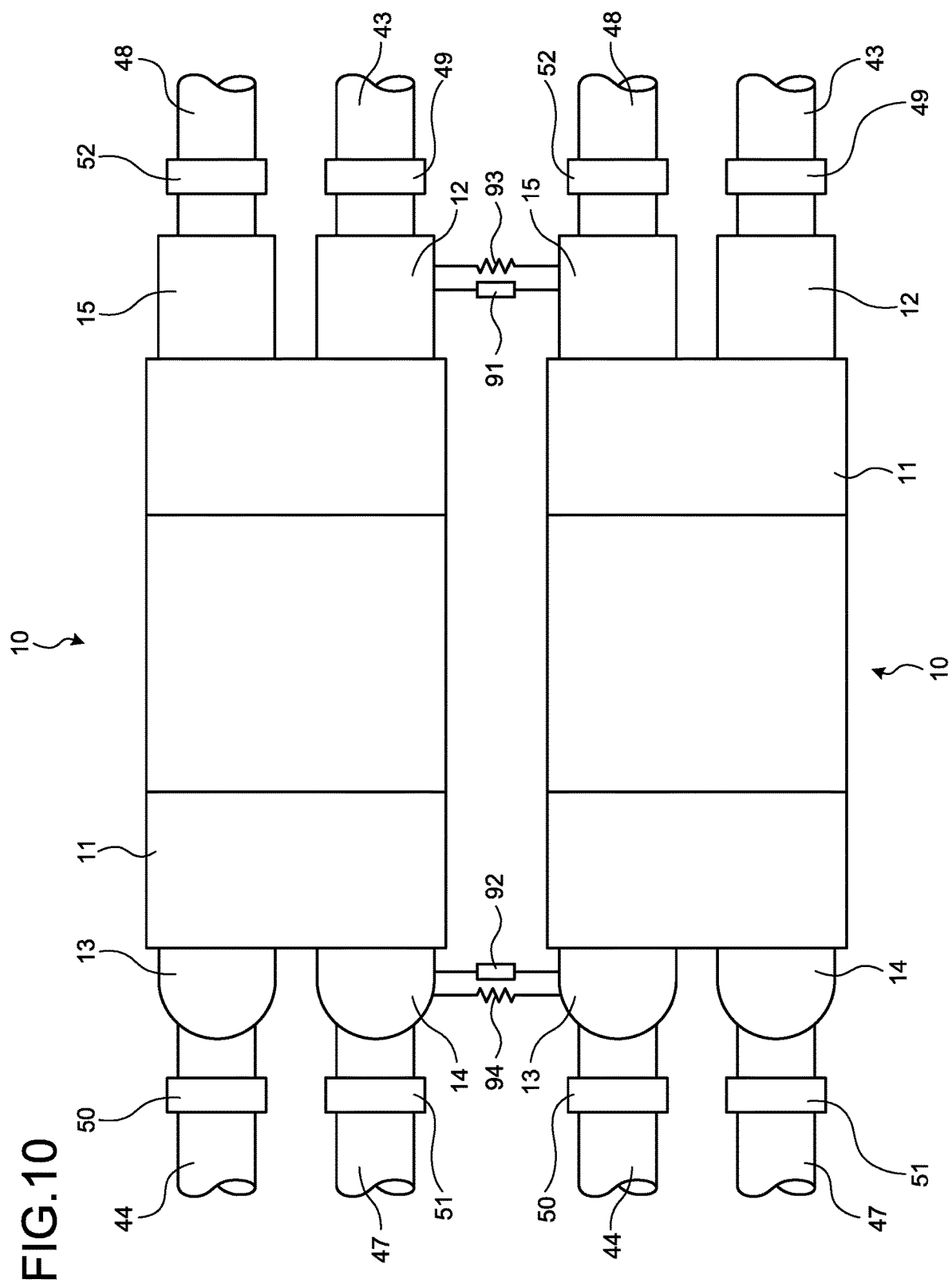
FIG. 10 is a plan view illustrating a condenser according to a third embodiment.
Figure 11:
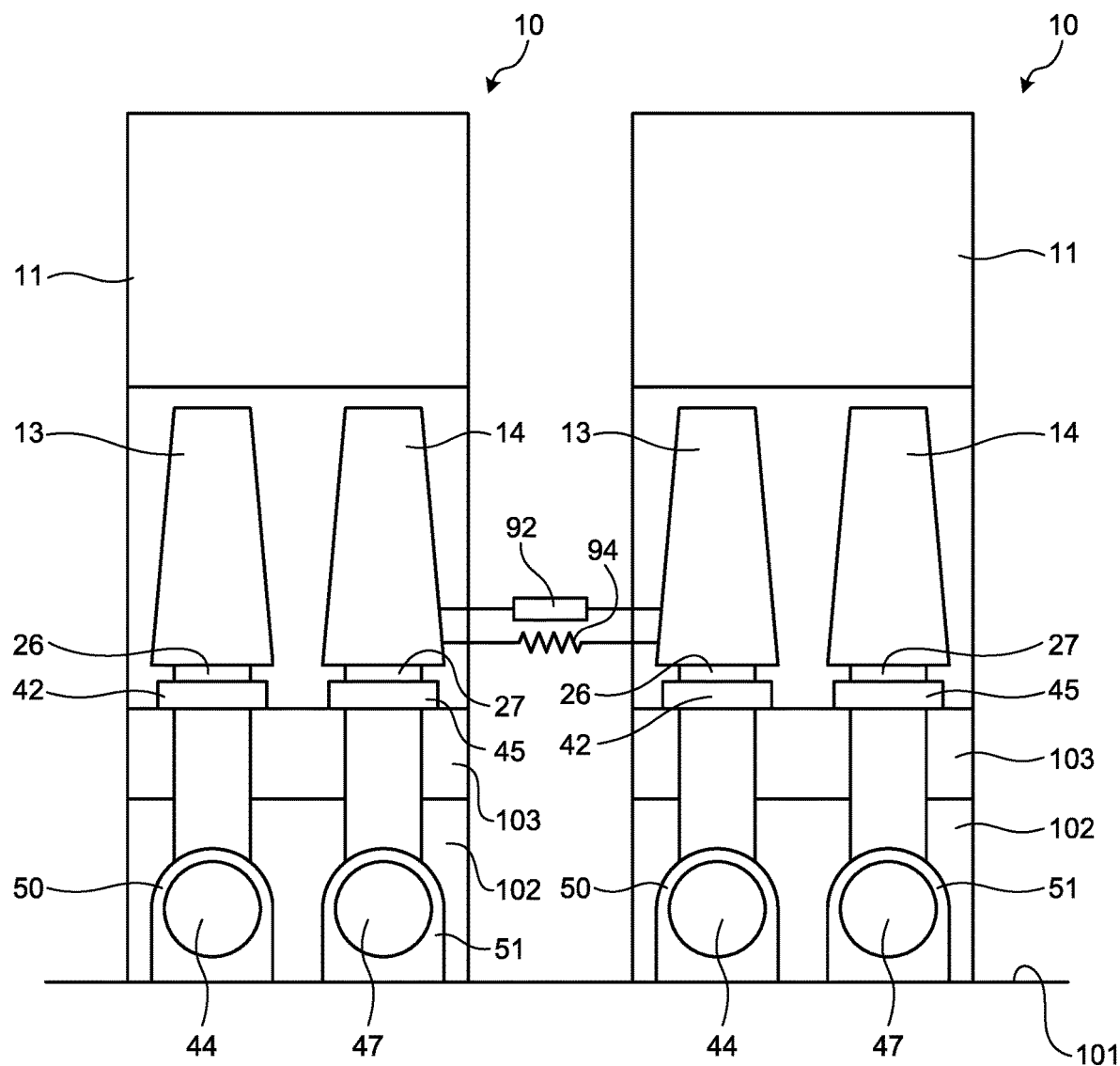
FIG. 11 is a side view of the condenser.

FIG. 10 is a plan view illustrating a condenser according to a third embodiment, and FIG. 11 is a side view of the condenser. Members having functions identical to those of the embodiments described above are denoted by like reference signs and detailed explanations thereof will be omitted.

In the third embodiment, as illustrated in FIG. 10 and FIG. 11, a plurality of condensers 10 are respectively arranged adjacent to each other at a predetermined position with a predetermined interval. The condensers 10 respectively include the housing 11, the inlet water chambers 12, 13, the outlet water chambers 14, 15, and the heat-transfer tube groups 16, 17. Damping members 91, 92 and restoration members 93, 94 are interposed between the inlet water chambers 12, 13 and the outlet water chambers 14, 15 in the respective housings 11 adjacent to each other.

That is, the damping member 91 and the restoration member 93 are interposed between the inlet water chamber 12 of one of the condensers 10 and the outlet water chamber 15 of the other condenser 10, and the damping member 92 and the restoration member 94 are interposed between the outlet water chamber 14 of one of the condensers 10 and the inlet water chamber 13 of the other condenser 10.

Therefore, when one of the condensers 10 adjacent to each other and the other condenser 10 operate in the natural vibration displacement mode according to the quantity of water in the respective housings 11, the housing 11, the inlet water chambers 12, 13 and the outlet water chambers 14, 15, and the intake pipes 43, 44 and the drainpipes 47, 48 are displaced in different directions, and relative displacement occurs between the inlet water chamber 12 and the outlet water chamber 15 adjacent to each other, and the inlet water chamber 13 and the outlet water chamber 14 adjacent to each other. At this time, the displacement of the inlet water chamber 12 and the outlet water chamber 15 is damped by the damping member 91, and the inlet water chamber 12 and the outlet water chamber 15 are restored to the original positions by the restoration member 93. Further, the displacement of the inlet water chamber 13 and the outlet water chamber 14 is damped by the damping member 92, and the inlet water chamber 13 and the outlet water chamber 14 are restored to the original positions by the restoration member 94. Therefore, displacement of the inlet water chambers 12, 13 and the outlet water chambers 14, 15 decreases and the inlet water chambers 12, 13 and the outlet water chambers 14, 15 are restored to the original positions. Accordingly, relative displacement of the inlet nozzles 25, 26 and the outlet nozzles 27, 28 with respect to the respective expansion joints 41, 42, 45, and 46 is suppressed, to decrease the stress acting on the expansion joints 41, 42, 45, and 46, thereby enabling to prevent breakage thereof.

In this manner, in the condenser according to the third embodiment, the damping member 91 and the restoration member 93 are interposed between the inlet water chamber 12 and the outlet water chamber 15 of the condensers 10 adjacent to each other, and the damping member 92 and the restoration member 94 are interposed between the inlet water chamber 13 and the outlet water chamber 14 adjacent to each other.

Therefore, the damping members 91, 92 damp the displacement of the inlet water chambers 12, 13 and the outlet water chambers 14, 15, and the restoration members 93, 94 restore the inlet water chambers 12, 13 and the outlet water chambers 14, 15 to the original positions. Accordingly, the displacement of the inlet water chambers 12, 13 and the outlet water chambers 14, 15 decreases, and the inlet water chambers 12, 13 and the outlet water chambers 14, 15 are restored to the original positions. Accordingly, relative displacement of the inlet water chambers 12, 13 and the outlet water chambers 14, 15 with respect to the intake pipes 43, 44 and the drainpipes 47, 48 is suppressed, to decrease the stress acting on the expansion joints 41, 42, 45, and 46. As a result, the quake resistance of the condenser 10 can be improved.

In the embodiments described above, the damping member is an oil damper, and the restoration member is a tension spring. However, the configuration is not limited thereto, and the damping member can be any type of damper such as an air damper, and an elastic member as well as the oil damper. Further, the restoration member can be any type of resilient element such as a biasing member made of synthetic resin, a rubber member, or the like can be applied other than the tension spring.

In the embodiments described above, the same number of damping members and restoration members are provided and arranged side by side. However, the damping members and the restoration members can be provided in different numbers and arranged separately.

In the embodiments described above, it is described that the condenser according to the present invention is applied as a condenser of a nuclear power plant having a pressurized water reactor. However, the condenser according to the present invention can be also applied to a condenser in a reactor of other types. Further, the condenser according to the present invention can be applied not only to the nuclear power plant but also as a condenser of a thermal power plant or a geothermal power plant.

REFERENCE SIGNS LIST 10 condenser
11 housing
12, 13 inlet water chamber
14, 15 outlet water chamber
16, 17 heat-transfer tube group
21 steam inlet
22 condensate outlet
23, 24 tube plate
25, 26 inlet nozzle
27, 28 outlet nozzle
31, 32 heat-transfer tube
33, 34 tube support plate
35 support member
37 noncondensable-gas discharge pipe
41, 42, 45, 46 expansion joint
43, 44 intake pipe
47, 48 drainpipe
49, 50, 51, 52 fixing bracket
61, 62, 62A, 62B, 63, 64, 81, 82, 91, 92 damping member
65, 66, 66A, 66B, 67, 68, 83, 84, 93, 94 restoration member
71, 72, 73, 74 support structure
101 installation surface
102 concrete base (concrete structure)
103 concrete leg
S steam
C seawater
W condensate

The invention claimed is:

1. A condenser comprising:
a housing formed in a hollow shape and provided with an inlet to receive steam and an outlet to discharge condensate;
an inlet water chamber and an outlet water chamber provided at respective ends of the housing;
a plurality of heat-transfer tubes configured to allow a cooling medium to flow therethrough, the heat-transfer tubes connecting the inlet water chamber to the outlet water chamber inside the housing;
an intake pipe coupled to the inlet water chamber via an intake expansion joint, and a drainpipe coupled to the outlet water chamber via a drain expansion joint;
dampers configured to dampen displacement of the inlet water chamber and the outlet water chamber; and
resilient elements configured to restore positions of the inlet water chamber and the outlet water chamber,
wherein the housing, the intake pipe, and the drainpipe are supported on an installation surface, a support structure having predetermined stiffness is positioned on the installation surface, the dampers and the resilient elements being arranged in sets each having a respective one of the dampers and a respective one of the resilient elements, and a first one of the sets being interposed between the inlet water chamber and the support structure, and a second one of the sets being interposed between the outlet water chamber and the support structure.

2. The condenser according to claim 1, wherein a concrete structure is on the installation surface, and the housing and the support structure are supported by the concrete structure.

3. The condenser according to claim 1, wherein the support structure surrounds the inlet water chamber and the outlet water chamber.

4. The condenser according to claim 1, wherein the inlet water chamber is one of a plurality of inlet water chambers, and the outlet water chamber is one of a plurality of outlet water chambers, the inlet water chambers and the outlet water chambers being arranged in a plurality of pairs each having a respective one of the outlet water chambers and a respective adjacent one of the inlet water chambers, each of the pairs being adjacent to a respective tube plate fixed to a respective one of ends of the housing, and one of the sets is interposed between the inlet water chamber and the outlet water chamber of each of the pairs.

5. The condenser according to claim 1, wherein the housing is one of a plurality of housings, one of the sets being interposed between the inlet water chamber of a first one of housings and the outlet water chamber of a second one of the housings, the first one and the second one of the housings being adjacent to each other.

6. The condenser according to claim 1, wherein ends of each of the damping members and each of the restoration members are rotatably supported.

7. The condenser according to claim 1, wherein the inlet water chamber and the outlet water chamber extend along a vertical direction, an inlet nozzle and an outlet nozzle provided at lower parts of the inlet water chamber and the outlet water chamber, respectively, are coupled to the intake pipe and the drainpipe via the intake expansion joint and the drain expansion joint, respectively, and ends of each of the damping members and each of the restoration members are coupled to a vicinity of the intake expansion joint and the drain expansion joint in the inlet water chamber and the outlet water chamber, respectively.

* * * * *